(12) United States Patent
Faust et al.

(10) Patent No.: US 11,659,132 B2
(45) Date of Patent: May 23, 2023

(54) ELECTRONIC DEVICE AND METHOD FOR SYNCHRONIZATION OF VIDEOS

(71) Applicant: SONY GROUP CORPORATION, Tokyo (JP)

(72) Inventors: Brent Faust, San Diego, CA (US); Edward Theodore Winter, San Diego, CA (US); Jianfei Max Chen, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 51 days.

(21) Appl. No.: 17/481,739

(22) Filed: Sep. 22, 2021

(65) Prior Publication Data

US 2023/0087345 A1 Mar. 23, 2023

(51) Int. Cl.
*H04N 5/073* (2006.01)
*H04N 23/90* (2023.01)

(52) U.S. Cl.
CPC ........... *H04N 5/0733* (2013.01); *H04N 23/90* (2023.01)

(58) Field of Classification Search
CPC ....... H04N 5/0733; H04N 5/247; H04N 23/90
See application file for complete search history.

(56) References Cited

U.S. PATENT DOCUMENTS

| | | | |
|---|---|---|---|
| 11,095,802 B2 * | 8/2021 | Tan | H04N 5/33 |
| 2017/0230610 A1 | 8/2017 | Tcheng | |
| 2018/0012350 A1 * | 1/2018 | Gangitano | H04N 5/247 |
| 2018/0035019 A1 | 2/2018 | Back | |
| 2021/0279957 A1 * | 9/2021 | Eder | H04N 5/23229 |

FOREIGN PATENT DOCUMENTS

| | | |
|---|---|---|
| CN | 104717426 A | 6/2015 |
| KR | 102294524 B1 | 8/2021 |

OTHER PUBLICATIONS

Liang, et al., "Synchronization for multi-perspective videos in the wild", International Conference on Acoustics, Speech and Signal Processing (ICASSP), IEEE, Mar. 5-7, 2017, 05 pages.

Rajagopal Niranjini et al: "Visual light landmarks for mobile devices", IPSN-14 Proceedings of the 13th International Symposium On Information Processing in Sensor Networks, IEEE, Apr. 15, 2014 (Apr. 15, 2014), pp. 249-260, XP032613163, DOI: 10.1109/IPSN.2014.6846757 ISBN: 978-1-4799-3146-0 [retrieved on Jun. 30, 2014] abstract p. 249 p. 251—p. 254 figures 1.7.8.

* cited by examiner

*Primary Examiner* — Christopher K Peterson
(74) *Attorney, Agent, or Firm* — Chip Law Group

(57) ABSTRACT

An electronic device including circuitry is provided. The circuitry generates a synchronization signal. The circuitry controls drive of one or more light-emitting devices based on the synchronization signal to generate a pattern of alternating light pulses. The circuitry further acquires a plurality of videos of the pattern of alternating light pulses from a plurality of imaging devices. The one or more light-emitting devices are positioned in a field of view of each of the plurality of imaging devices. The circuitry determines a frame in each video of the plurality of videos that includes a specific portion of the pattern of alternating light pulses. The determined frame in each of the plurality of videos corresponds to the same time instant. The circuitry synchronizes the plurality of videos based on the determination.

20 Claims, 7 Drawing Sheets

ELECTRONIC DEVICE AND METHOD FOR SYNCHRONIZATION OF VIDEOS

CROSS-REFERENCE TO RELATED APPLICATIONS/INCORPORATION BY REFERENCE

None.

FIELD

Various embodiments of the disclosure relate to synchronization of videos. More specifically, various embodiments of the disclosure relate to an electronic device and a method for synchronization of videos.

BACKGROUND

Professionals in various media industries such as the entertainment industry and mass communication industry may employ multiple cameras to record a scene (such as a video). For example, the multiple cameras may be used to record the scene from different viewpoints such that the scene may be captured and/or viewed from multiple viewpoints. These cameras may start capture of videos of the scene at different start times and may record the videos of the scene independent of one another, since the cameras may not be synchronized to start the capture at the same time. Conventionally, a clapperboard have been used to mark the beginning of the scene and to synchronize picture and sound of the scene during video production. However, these conventional techniques may be inaccurate or ineffective for synchronization of videos in cases where there are other sounds recorded in the scene that are indistinguishable from the clapperboard sound. In some cases, a synchronization cable may be utilized to physically connect the multiple cameras to synchronize the videos recoded by each camera of the multiple cameras. However, a physical connection of the multiple cameras through the synchronization cable may not be practically feasible in situations where the cameras are mounted on moving bodies (such as separate movable rigs or vehicles). Accordingly, hardware solutions may be impractical for use in synchronization of the videos when the cameras are in motion.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and a method for synchronization of videos, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
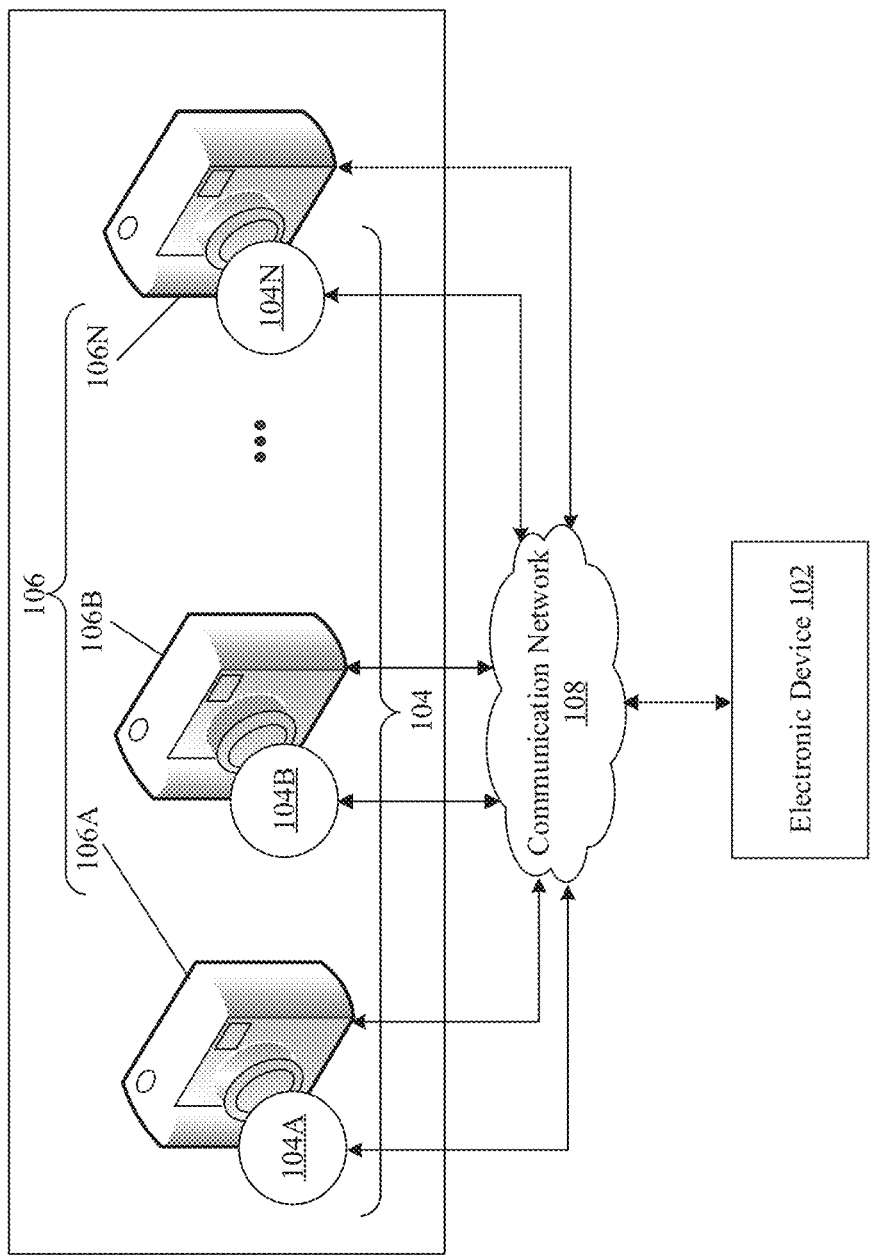
FIG. 1 is a block diagram that illustrates an exemplary network environment for synchronization of videos, in accordance with an embodiment of the disclosure.

The following described implementations may be found in the disclosed electronic device and method for synchronization of videos. Exemplary aspects of the disclosure provide an electronic device for synchronization of a plurality of videos of a scene captured by a plurality of imaging devices (for example, cameras). The electronic device may be configured to generate a synchronization signal. In some embodiments, the synchronization signal may include a preamble of a first time duration and a sequence of alternating ON/OFF pulses of a second time duration. The electronic device may be further configured to control drive of one or more light-emitting devices (for example, a light-emitting diode (LED) or an LED strip) based on the synchronization signal to generate a pattern of alternating light pulses. The one or more light-emitting devices may be positioned in a field of view (for example, in front of a lens) of each of the plurality of imaging devices. For example, the one or more light-emitting devices may be positioned in front of each imaging device of the plurality of imaging devices at a time of capture or prior to capture of the scene. In accordance with an embodiment, the one or more light-emitting devices may be switched ON for the first time duration based on the preamble and may be alternatively switched ON and OFF for the second time duration based on the sequence of alternating ON/OFF pulses. The electronic device may be configured to acquire a plurality of videos of the pattern of alternating light pulses, generated by the one or more light-emitting devices, from the plurality of imaging devices.

The electronic device may be configured to determine a frame in each video of the plurality of videos that includes a specific portion (such as start light pulse or an end light pulse) of the pattern of alternating light pulses. The determined frame in each video of the plurality of videos corresponds to the same time instant (for example, same wall clock time). In accordance with an embodiment, the specific portion of the pattern of alternating light pulses may include one of a start light pulse of the pattern of alternating light pulses or the end light pulse of the pattern of alternating light pulses. The electronic device may synchronize the plurality of videos based on the determination of the frame in each video of the plurality of videos that may correspond to the specific portion (such as an end light pulse) of the pattern of alternating light pulses. Thus, the electronic device may improve accuracy of the synchronization by automatic synchronization of the plurality of videos from the plurality of imaging devices based on the pattern of alternating light pulses corresponding to the synchronization signal.

In an embodiment, the one or more light-emitting devices may be removed from the field of view of each of the plurality of imaging devices after generation of the pattern of alternating light pulses. In such a case, the plurality of imaging devices may continue capture of the scene without obstruction from the one or more light-emitting devices. Accordingly, the electronic device may synchronize the plurality of videos from the plurality of imaging devices in situations where the plurality of imaging devices may be mounted on moving bodies (such as separate movable rigs or vehicles). The electronic device may further enable synchronization of the plurality of videos during production based on the pattern of alternating light pulses corresponding to the synchronization signal, thereby eliminating the need for hardware solutions or the need to physically connect the plurality of imaging devices via a synchronization cable to synchronize the plurality of videos.

In an embodiment, the sequence of alternating ON/OFF pulses may comprise an ON pulse of a first time interval that may alternate with an OFF pulse of a second time interval. The electronic device may be configured to set the first time duration of the preamble based on a frame rate of each video of the plurality of videos. The first time duration of the preamble may be longer than each of the first time interval of the ON pulse and the second time interval of the OFF pulse. The electronic device may utilize the preamble (for example, a long pulse) of the synchronization signal prior to the sequence of alternating ON/OFF pulses (for example, short pulses) to reduce false positives in the detection of the synchronization signal, which may further improve the accuracy of the synchronization of the plurality of videos, and provide a reliable technique for the synchronization of the plurality of videos.

FIG. 1 is a block diagram that illustrates an exemplary network environment for synchronization of videos, in accordance with an embodiment of the disclosure. With reference to FIG. 1, there is shown a network environment 100. In the network environment 100, there is shown an electronic device 102. In the network environment 100, there is further shown one or more light-emitting devices 104, such as a first light-emitting device 104A, a second light-emitting device 104B, up to an Nth light-emitting device 104N. In the network environment 100, there is further shown a plurality of imaging devices 106, such as a first imaging device 106A, a second imaging device 106B, up to an Nth imaging device 106N. In the network environment 100, there is further shown a communication network 108. The electronic device 102, the one or more light-emitting devices 104, and the plurality of imaging devices 106 may be communicably coupled to each other via the communication network 108. It may be noted that although FIG. 1 shows the first light-emitting device 104A, the second light-emitting device 104B, and the Nth light-emitting device 104N, the disclosure is not so limited. In some embodiments, the network environment 100 may include a single light-emitting device (such as the first light-emitting device 104A) in a field of view of each of the plurality of imaging devices 106, without deviating from scope of the disclosure.

The electronic device 102 may include suitable logic, circuitry, and interfaces that may be configured to generate the synchronization signal, control drive of the one or more light-emitting devices 104 based on the synchronization signal to generate a pattern of alternating light pulses, acquire a plurality of videos of the pattern of alternating light pulses from the plurality of imaging devices 106, determine a frame in each video of the plurality of videos that corresponds to a specific portion of the pattern of alternating light pulses, and synchronize the plurality of videos based on the determination. The electronic device 102 may be further configured to acquire a frame rate (for example, 30 frames per second) of each video of the plurality of videos from the plurality of imaging devices 106. The electronic device 102 may be further configured to set the first time duration (for example, 1 second) or the length (for example, 30 frames) of the preamble, the first time interval of the ON pulse of the pattern of alternating light pulses, and the second time interval of the OFF pulse of the pattern of alternating light pulses based on the acquired frame rate of each video of the plurality of videos. The electronic device 102 may be further configured to execute one or more algorithms on the plurality of videos to determine the frame in each video of the plurality of videos that corresponds to the specific portion of the pattern of alternating light pulses. Examples of the electronic device 102 may include, but are not limited to, a computing device, a smartphone, a cellular phone, a mobile phone, a gaming device, a mainframe machine, a server, a computer workstation, a microcontroller, and/or any consumer electronic (CE) device with capabilities of drive control of the one or more light-emitting devices 104 and image processing of the plurality of videos. In an embodiment, the electronic device 102 may comprise separate circuitry and interfaces for drive control of the one or more light-emitting devices 104 and the processing of the plurality of videos.

The plurality of imaging devices 106 may include suitable logic, circuitry, and interfaces that may be configured to capture the plurality of videos, such as the plurality of videos of a scene. The plurality of imaging devices 106 may be further configured to capture the plurality of videos of the pattern of alternating light pulses. For example, the plurality of imaging devices 106 may capture the plurality of videos of the pattern of alternating light pulses prior to capture of the scene. In an embodiment, the plurality of imaging devices 106 may start the capture the plurality of videos at different start times, and may record the plurality of videos independent of one another. The plurality of imaging devices 106 may store and transmit the plurality of videos for processing (such as synchronization) to the electronic device 102. Examples of the plurality of imaging devices 106 may include, but are not limited to, an image sensor, a wide-angle camera, an action camera, a closed-circuit television (CCTV) camera, a camcorder, a digital camera, a camera phone, a time-of-flight camera (ToF camera), a night-vision camera, and/or other image capture devices.

The one or more light-emitting devices 104 may include suitable logic, circuitry, and interfaces that may be configured to generate a pattern of alternating light pulses. The one or more light-emitting devices 104 may generate the pattern of alternating light pulses based on the synchronization signal generated by the electronic device 102. For example, the one or more light-emitting devices 104 may be switched ON based on the preamble to emit a preamble light pulse for the first time duration. The one or more light-emitting devices 104 may be alternatively switched ON and OFF for the second time duration based on the sequence of alternating ON/OFF pulses. The one or more light-emitting devices 104 may be alternatively switched ON and OFF based on the sequence of alternating ON/OFF pulses that comprises an ON pulse of a first time interval that alternates with an OFF pulse of a second time interval. The electronic device 102 may control the drive of the one or more light-emitting devices 104 based on the synchronization signal. The electronic device may be connected to one or more light-emitting devices 104 either wirelessly or through a wired connection. In an embodiment, the one or more light-emitting devices 104 may be driven by a direct current (DC), which may be turned ON and OFF by a component (such as a field-effect transistor (FET)) of the electronic device 102. In an embodiment, the one or more light-emitting devices 104 may be driven by an alternating current using an inbuilt DC converter or rectifier. Examples of the one or more light-emitting devices 104 may include, but are not limited to, a light-emitting diode (LED) or an LED strip. For example, the LED may be an LED bulb, an LED lighting tube, an LED surface mounted device and a chip-on-board LED. In an embodiment, the one or more light-emitting devices 104 may be configured to emit a light at a light intensity equal to or greater than a threshold intensity level. In another embodiment, the one or more light-emitting devices 104 may be capable of switching ON and OFF at a specific frequency or higher based on the frame rate of the plurality of videos. For example, the higher the frame rate of the plurality of videos is, the higher the switching frequency of the one or more light-emitting devices 104 may be.

The communication network 108 may include a communication medium through which the electronic device 102, the one or more light-emitting devices 104, and the plurality of imaging devices 106 may communicate with each other. The communication network 108 may be one of a wired connection or a wireless connection. For example, the electronic device 102 may control the drive of the one or more light-emitting devices 104 through the communication network 108. The electronic device 102 may acquire the plurality of videos from the plurality of imaging devices 106 through the communication network 108. Examples of the communication network 108 may include, but are not limited to, the Internet, a cloud network, Cellular or Wireless Mobile Network (such as Long-Term Evolution and 5G New Radio), a Wireless Fidelity (Wi-Fi) network, a Personal Area Network (PAN), a Local Area Network (LAN), or a Metropolitan Area Network (MAN). Various devices in the network environment 100 may be configured to connect to the communication network 108 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the plurality of imaging devices 106 may be arranged at different positions to record a scene, for example, a video scene. The plurality of imaging devices 106 may be arranged to record the scene from different viewpoints. In one or more embodiments, the plurality of imaging devices 106 may be switched ON and switch OFF manually. The plurality of imaging devices 106 may be switched ON to start capture of the plurality of videos at different time instants. For example, the second imaging device 106B may be switched ON a few seconds after the first imaging device 106A is switched ON. The one or more light-emitting devices 104 may be positioned in the field of view of each of the plurality of imaging devices 106. The one or more light-emitting devices 104 may be positioned in the field of view of each of the plurality of imaging devices 106 when the plurality of imaging devices 106 start capturing the plurality of videos. In accordance with an embodiment, the one or more light-emitting devices 104 may include the LED or the LED strip. In some embodiments, a distance between each light-emitting device, such as the first light-emitting device 104A of the one or more light-emitting devices 104 and a corresponding imaging device, such as the first imaging device 106A of the plurality of imaging devices 106 may be less than or equal to two feet.

The electronic device 102 may be configured to generate the synchronization signal. For example, the electronic device 102 may receive a user input via the I/O device 206 (shown in FIG. 2), to generate the synchronization signal. In accordance with an embodiment, the generated synchronization signal may include a preamble of a first time duration and a sequence of alternating ON/OFF pulses of a second time duration. In accordance with an embodiment, the sequence of alternating ON/OFF pulses may include an ON pulse of a first time interval that may alternate with an OFF pulse of a second time interval. The first time interval may be equal to the second time interval. In another embodiment, the first time interval may be different from the second time interval. Details of the generation of the synchronization signal are further described, for example, in FIG. 3.

Based on the generated synchronization signal, the electronic device 102 may control drive of the one or more light-emitting devices 104 to generate the pattern of alternating light pulses. For example, the electronic device 102 may cause a DC control circuit 208 (shown in FIG. 2) to control the drive of the one or more light-emitting devices 104. In some embodiments, the sequence of alternating ON/OFF pulses of the second time duration may correspond to the pattern of alternating light pulses. The one or more light-emitting devices 104 may be switched ON based on the preamble to emit a preamble light pulse for the first time duration. The one or more light-emitting devices 104 may be alternatively switched ON and OFF for the second time duration based on the sequence of alternating ON/OFF pulses. Details of the control of the drive of the one or more light-emitting devices 104 are further provided for example, in FIG. 4.

In accordance with an embodiment, the circuitry 202 may be configured to set the first time duration of the preamble based on a frame rate of each video of the plurality of videos. The frame rate may depend on a shutter speed of each imaging device of the plurality of imaging devices 106. In an exemplary embodiment, the frame rate may be 30 frames per second (fps). Based on the frame rate, the first time duration of the preamble may be for example, one second. The preamble may include 30 frames of the video. In some embodiments, the time duration of the preamble may be longer than each of the first time interval of the ON pulse and the second time interval of the OFF pulse of the sequence of alternating ON/OFF pulses. In one or more embodiments, the circuitry 202 may be configured to set the first time interval of the ON pulse and the second time interval of the OFF pulse based on the frame rate of each video of the plurality of videos. For example, the first time interval of each of the ON pulse and the second time interval of the OFF pulse may be 1/30th of a second. Accordingly, each of the ON pulse and the OFF pulse may correspond to one frame of the video.

The plurality of imaging devices 106 may capture the pattern of alternating light pulses generated by the one or more light-emitting devices 104. The electronic device 102 may acquire the plurality of videos of the pattern of alternating light pulses from the plurality of imaging devices 106. The plurality of videos may include the preamble light pulse and the pattern of alternating light pulses generated by the one or more light-emitting devices 104. Details of the acquisition of the plurality of videos are further described, for example, in FIG. 4.

Figure 4:
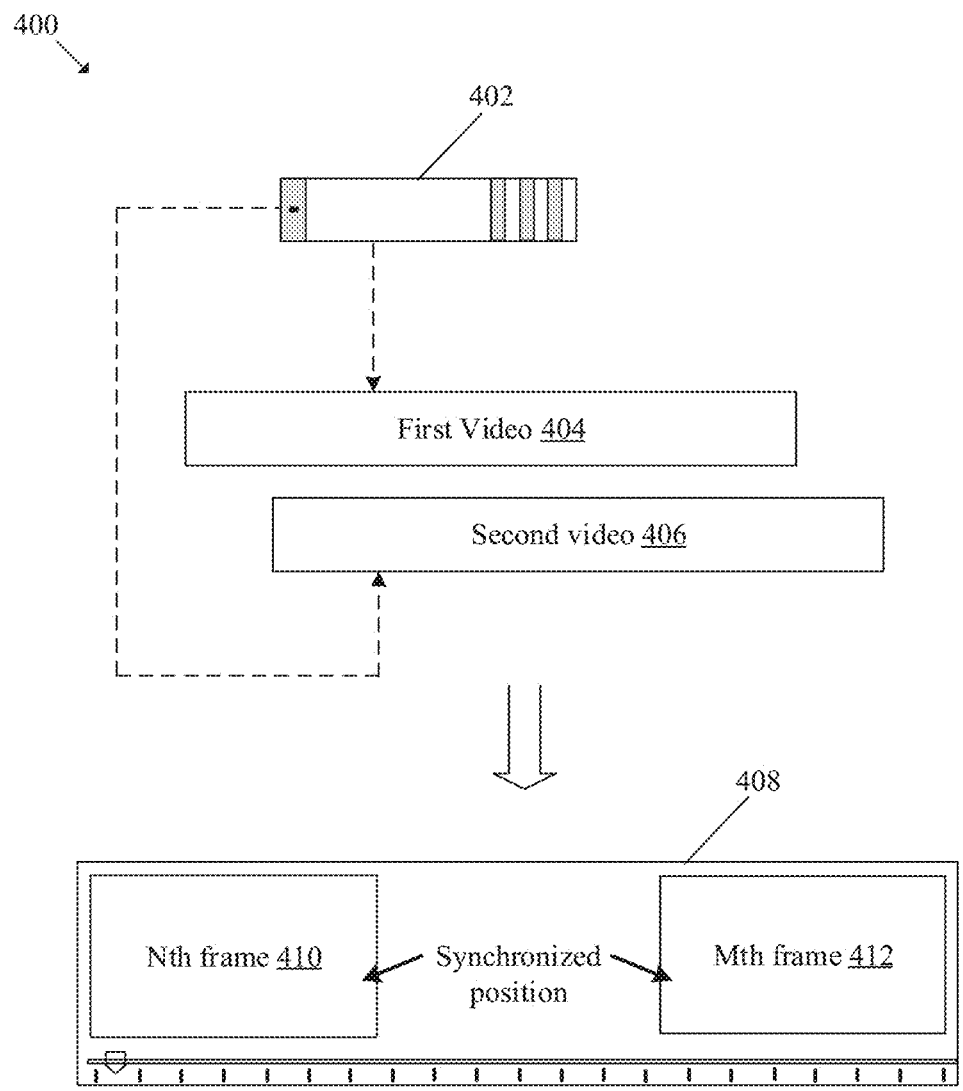
FIG. 4 is a diagram that illustrates detection of a synchronization signal for synchronization of videos, in accordance with an embodiment of the disclosure.

The electronic device 102 may further determine a frame (or a frame number) in each video of the plurality of videos that includes a specific portion (such as a start light pulse or an end light pulse) of the pattern of alternating light pulses. The determined frame in each video of the plurality of videos corresponds to the same time instant (for example, the same wall clock time). The correspondence of the frame number with the specific portion in each video may be arbitrary, as long as the frame number corresponds to the same wall clock time in each video. For example, the specific portion of the pattern of alternating light pulses may include one of a start light pulse of the pattern of alternating light pulses or the end light pulse of the pattern of alternating light pulses. For example, an Nth frame of the first video of the plurality of videos and an Mth frame of the second video of the plurality of videos (as shown in FIG. 4) may correspond to the specific portion of the pattern of alternating light pulse. Details of the determination of the frame are further described for example, in FIGS. 4 and 5. For example, each video of the plurality of videos captured by a corresponding imaging device of the plurality of imaging devices 106 includes a sequence of frames. The electronic device 102 may determine the closest frame number corresponding to the same wall clock time for each sequence of frames (with one sequence of frames per imaging device). The electronic device 102 may further synchronize the plurality of videos based on the determination of the frame (or frame number) that includes the specific portion (such as the start light pulse or the end light pulse) that corresponds to the same wall clock time. Thus, the electronic device 102 may improve accuracy of the synchronization by automatic synchronization of the plurality of videos from the plurality of imaging devices 106 based on the pattern of alternating light pulses corresponding to the synchronization signal.

In an embodiment, the one or more light-emitting devices 104 may be removed from the field of view of each of the plurality of imaging devices 106 after generation of the pattern of alternating light pulses. In such a case, the plurality of imaging devices 106 may continue capture of the scene without obstruction from the one or more light-emitting devices 104. Accordingly, the electronic device 102 may synchronize the plurality of videos from the plurality of imaging devices 106 in situations where the plurality of imaging devices 106 may be mounted on moving bodies (such as separate movable rigs or vehicles). The electronic device 102 may further enable synchronization of the plurality of videos during production based on the pattern of alternating light pulses corresponding to the synchronization signal, thereby eliminating the need for hardware solutions or the need to physically connect the plurality of imaging devices 106 via a synchronization cable to synchronize the plurality of videos.

In an embodiment, the electronic device 102 may be configured to set the first time duration of the preamble to be longer than each of the first time interval of the ON pulse and the second time interval of the OFF pulse of the sequence of alternating ON/OFF pulses. The electronic device may utilize the preamble (for example, a long pulse) prior to the sequence of alternating ON/OFF pulses (for example, short pulses) to reduce false positives in the detection of the synchronization signal, which may further improve the accuracy of the synchronization of the plurality of videos.

In accordance with an embodiment, the electronic device 102 may detect the preamble light pulse of the first time duration in the first video of the plurality of videos. In one or more embodiments, the electronic device 102 may detect the preamble light pulse of the first time duration in a second video of the plurality of videos. The electronic device 102 may synchronize the first video and the second video of the plurality of videos, based on the detection of the preamble light pulse in each of the first video and the second video. In some embodiments, the electronic device 102 may detect the pattern of alternating light pulses of the second time duration in the first video and the second video subsequent to the detection of the preamble light pulse of the first time duration. The electronic device 102 may synchronize the first video and the second video based on the detection of the pattern of alternating light pulses in each of the first video and the second video. In another embodiment, the electronic device 102 may detect both the preamble and the pattern of alternating light pulses of the second time duration in the first video and the second video. The electronic device 102 may synchronize the first video and the second video based on the detection of both the preamble and the pattern of alternating light pulses in each of the first video and the second video. Details of the detection of the preamble light pulse and the pattern of alternating light pulses for the synchronization are further described for example, in FIGS. 6A and 6B.

Figure 2:
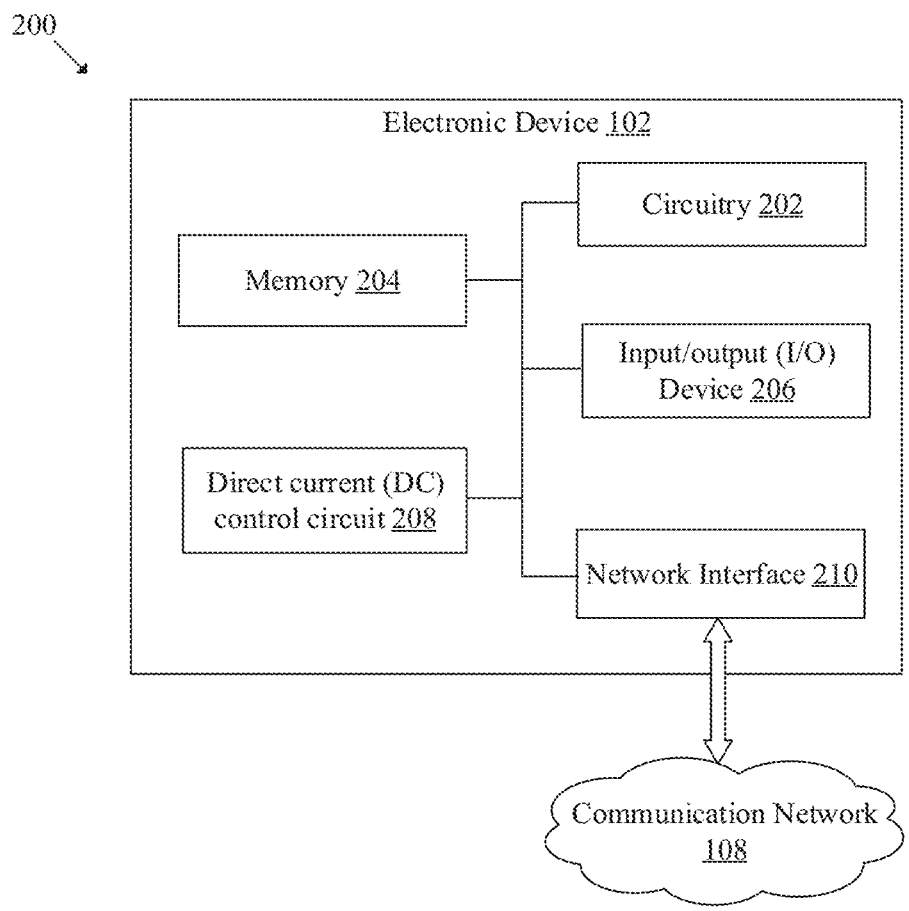
FIG. 2 is a block diagram that illustrates an exemplary electronic device for synchronization of videos, in accordance with an embodiment of the disclosure.

FIG. 2 is a block diagram that illustrates an exemplary electronic device for synchronization of videos, in accordance with an embodiment of the disclosure. With reference to FIG. 2, there is shown a block diagram 200 of the electronic device 102. The electronic device 102 may include circuitry 202, a memory 204, an input/output (I/O) device, a direct current (DC) control circuit 208, and a network interface 210.

The circuitry 202 may include suitable logic, circuitry, and/or interfaces, that may be configured to execute program instructions associated with different operations to be executed by the electronic device 102. For example, some of the operations may include generation of the synchronization signal, control of the drive of the one or more light-emitting devices 104 to generate the pattern of alternating light pulses, acquisition of the plurality of videos of the pattern of alternating light pulses from the plurality of imaging devices 106, determination of the frame in each video of the plurality of videos that may correspond to the specific portion of the pattern of alternating light pulses, and synchronization of the plurality of videos based on the determination. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits. In an embodiment, the circuitry 202 may include a first circuitry for the generation of the synchronization signal, and the control of the drive of the one or more light-emitting devices 104. The circuitry 202 may include a second circuitry including a processor to execute one or more algorithms for the determination of the frame in each video of the plurality of videos that may correspond to the specific portion of the pattern of alternating light pulses, and the synchronization of the plurality of videos based on the determination.

Figure 6A:
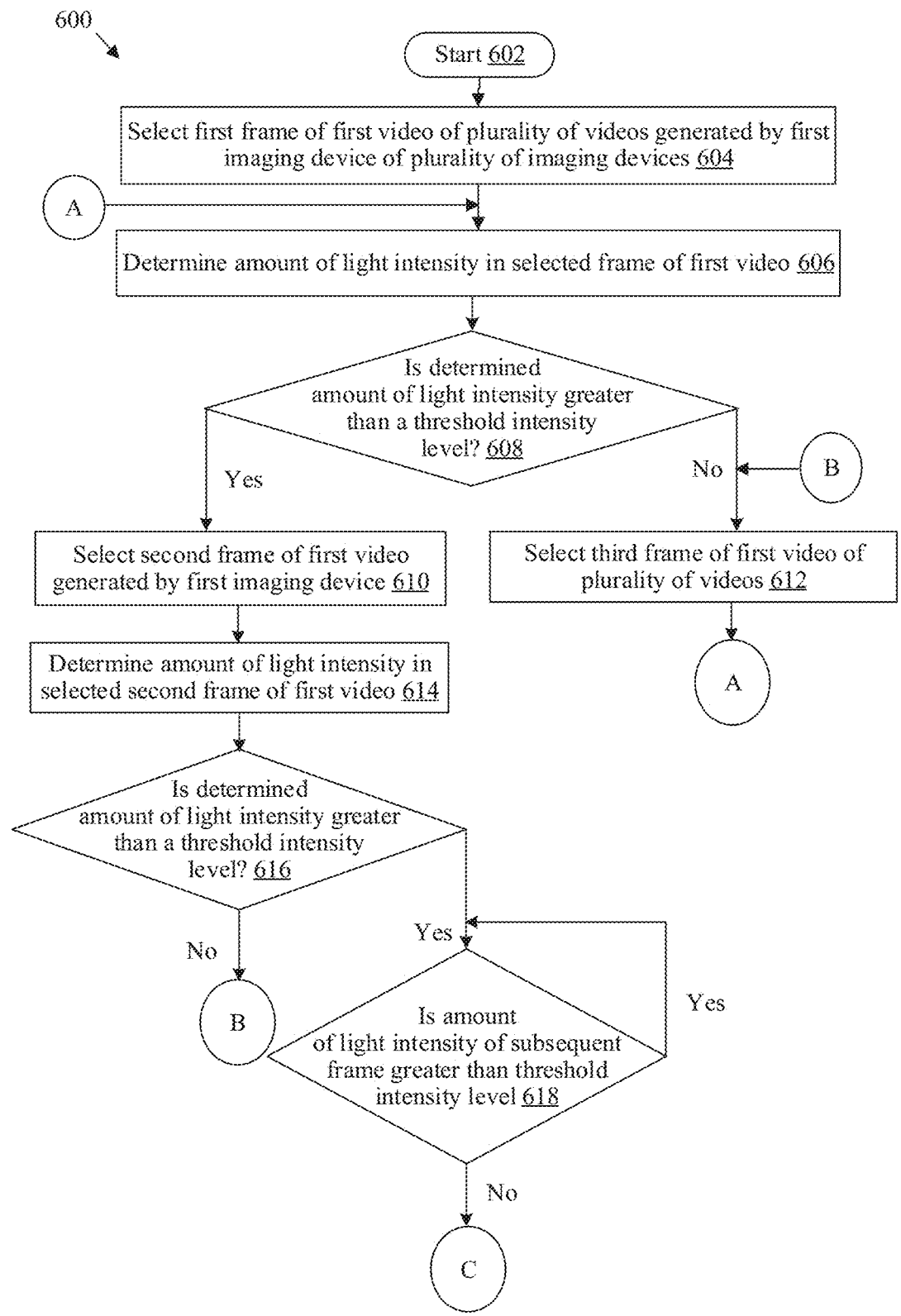
FIGS. 6A and 6B are flowcharts that collectively illustrate an exemplary method for detection of a preamble of a synchronization signal for synchronization of videos, in accordance with an embodiment of the disclosure.
Figure 6B:
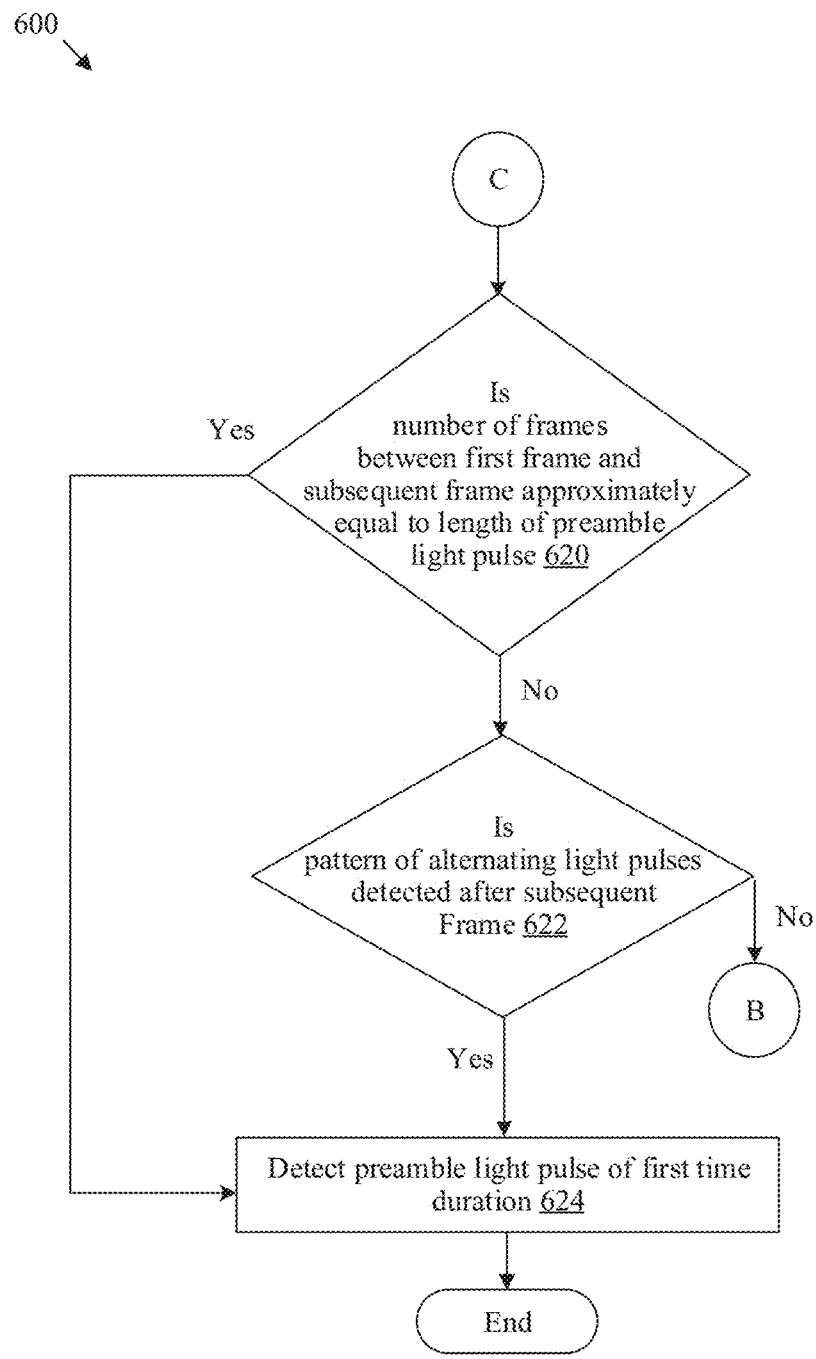

The memory 204 may include suitable logic, circuitry, interfaces, and/or code that may be configured to store the one or more instructions to be executed by the circuitry 202. The memory 204 may be configured to store the plurality of videos captured by the plurality of imaging devices 106. The memory 204 may be configured to store the synchronization signal having different patterns of long pulse (such as the preamble) and short alternating pulses. For example, the memory 204 may store information of a first time duration of the preamble and a second time duration of the sequence of alternating ON/OFF pulses. In another example, the memory 204 may store information of a first time interval of the ON pulse of the sequence of alternating ON/OFF pulses and the second time interval of the OFF pulse of the sequence of alternating ON/OFF pulses. The memory 204 may be further configured to store a threshold intensity level for the detection of the preamble light pulse and the alternating light pulses. In some embodiments, the memory 204 may be configured to store one or more algorithms (as shown in the flowchart of FIGS. 6A and 6B) for the detection of the preamble and the determination of the frame in each video of the plurality of videos that may correspond to the specific portion of the pattern of alternating light pulses. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive an input and provide an output based on the received input. For example, the I/O device 206 may receive an input from a user for synchronization of the plurality of videos. The I/O device 206 which may include various input and output devices, may be configured to communicate with the circuitry 202. Examples of the I/O device 206 may include, but are not limited to, a touch screen, a keyboard, a mouse, a joystick, a microphone, a display device, and a speaker. The I/O device 206 may include a touch screen display which may receive a user input by touch input. The touch screen may be at least one of a resistive touch screen, a capacitive touch screen, or a thermal touch screen. The touch screen display may be realized through several known technologies such as, but not limited to, at least one of a Liquid Crystal Display (LCD) display, a Light Emitting Diode (LED) display, a plasma display, or an Organic LED (OLED) display technology, or other display devices.

The DC control circuit 208 may include suitable logic, circuitry, and interfaces that may be configured to control the drive of the one or more light-emitting devices 104 based on the synchronization signal. The DC control circuit 208 may receive the synchronization signal from the circuitry 202. The DC control circuit 208 may switch ON and switch OFF the one or more light-emitting devices 104 based on the received synchronization signal. Based on the switching ON and switching OFF of the one or more light-emitting devices 104, the one or more light-emitting devices 104 may generate the pattern of alternating light pulses. In an exemplary embodiment, the DC control circuit 208 may include a rectifier and a metal oxide semiconductor field effect transistor (MOSFET) which may switch ON and OFF the one or more light-emitting devices 104 based on the synchronization signal. Although in FIG. 2, the DC control circuit 208 is shown separated from the circuitry 202, the disclosure is not so limited. Accordingly, in some embodiments, the DC control circuit 208 may be integrated in the circuitry 202, without deviating from scope of the disclosure.

The network interface 210 may comprise suitable logic, circuitry, and/or interfaces that may be configured to facilitate communication between the electronic device 102, the one or more light-emitting devices 104, and the plurality of imaging devices 106 via the communication network 108. The network interface 210 may be implemented by use of various known technologies to support wired or wireless communication of the electronic device 102 with the communication network 108. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

A person of ordinary skill in the art will understand that the electronic device 102 in FIG. 2 may also include other suitable components or systems, in addition to the components or systems which are illustrated herein to describe and explain the function and operation of the present disclosure. A detailed description for the other components or systems of the electronic device 102 has been omitted from the disclosure for the sake of brevity. The operations of the circuitry 202 are further described, for example, in FIGS. 3-6.

Figure 3:
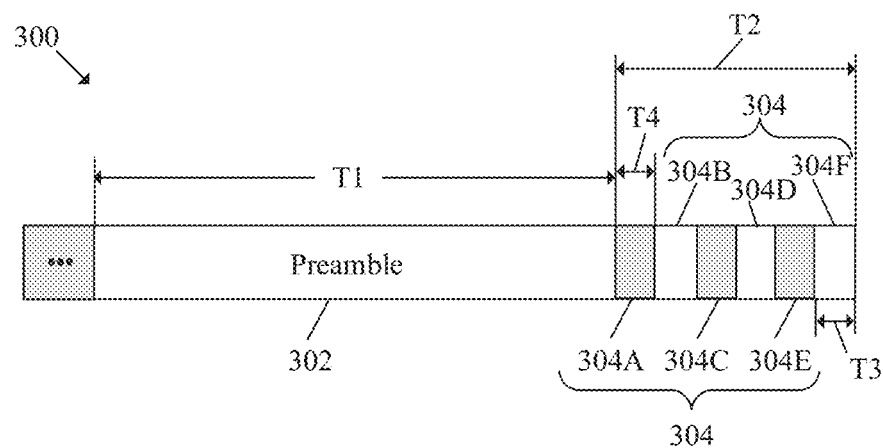
FIG. 3 is a diagram that illustrates an exemplary synchronization signal for synchronization of videos, in accordance with an embodiment of the disclosure.

FIG. 3 is a diagram that illustrates an exemplary synchronization signal for synchronization of videos, in accordance with an embodiment of the disclosure. FIG. 3 is explained in conjunction with elements from FIGS. 1 and 2. With reference to FIG. 3, there is shown an exemplary synchronization signal 300. The synchronization signal 300 may include a preamble 302 and a sequence of alternating ON/OFF pulses 304. The sequence of alternating ON/OFF pulses 304 may include a first OFF pulse 304A, a first ON pulse 304B, a second OFF pulse 304C, a second ON pulse 304D, a third OFF pulse 304E, and a third ON pulse 304F.

The circuitry 202 may be configured to generate the synchronization signal 300. In accordance with an embodiment, the generated synchronization signal 300 may include the preamble 302 (for example, a long ON pulse) of the first time duration T1. The synchronization signal 300 may further include the sequence of alternating ON/OFF pulses 304 of the second time duration T2 subsequent to the preamble 302. The sequence of alternating ON/OFF pulses 304 may correspond to the pattern of alternating light pulses. The synchronization signal 300 may be a visual synchronization signal or an audio synchronization signal. In an embodiment, the initial few pulses of the synchronization signal 300 prior to the preamble may be OFF pulses.

In accordance with an embodiment, the circuitry 202 may be configured to set the first time duration T1 of the preamble 302 based on the frame rate of each video of the plurality of videos. In an exemplary implementation, the frame rate (e.g. fps) of each video of the plurality of videos may be predefined based on the setting of the plurality of imaging devices 106, and may depend on a type of shutter (such as rolling shutter or global shutter) of the plurality of imaging devices 106. The frame rate may further be set by a user input. In an example, the frame rate may be 30 frames per second. Based on the frame rate, the first time duration T1 of the preamble may be for example, one second. In such a case, the length of the preamble 302 may be 30 frames.

In accordance with an embodiment, the sequence of alternating ON/OFF pulses 304 may include an ON pulse of a first time interval T3 that alternates with an OFF pulse of a second time interval T4. For example, the sequence of alternating ON/OFF pulses 304 may include the one or more ON pulses, such as the first ON pulse 304B, the second ON pulse 304D, and the third ON pulse 304F each of the first time interval T3. The sequence of alternating ON/OFF pulses 304 may further include the one or more an OFF pulses, such as the first OFF pulse 304A, the second OFF pulse 304C and the third OFF pulse 304E each of the second time interval T4. A position of each pulse may be such that each ON pulse may alternate with each OFF pulse of the sequence of alternating ON/OFF pulses 304.

In an embodiment, the first time duration T1 of the preamble 302 may be longer than each of the first time interval T3 of the ON pulse and the second time interval T4 of the OFF pulse of the sequence of alternating ON/OFF pulses 304. In some embodiments, the first time interval T3 of each ON pulse may be equal to the second time interval T4 of each OFF pulse of the sequence of alternating ON/OFF pulses 304. For example, the first time interval T3 may be in the range of 3-15 milliseconds. The second time interval T4 may be in the range of 3-15 milliseconds. Accordingly, the first time interval T3 of the first ON pulse 304B, the second ON pulse 304D, and the third ON pulse 304F may be 10 milliseconds. Similarly, the second time interval T4 of the first OFF pulse 304A, the second OFF pulse 304C, and the third OFF pulse 304E may be 10 milliseconds.

In one or more embodiments, the first time interval T3 of each ON pulse may be different from the second time interval T4 of each OFF pulse of the sequence of alternating ON/OFF pulses 304. For example, the first time interval T3 may be 10 milliseconds. The second time interval T4 may be 15 milliseconds. Accordingly, the first time interval T3 of the first ON pulse 304B, the second ON pulse 304D, and the third ON pulse 304F may be 10 milliseconds. Further, the second time interval T4 of the first OFF pulse 304A, the second OFF pulse 304C and the third OFF pulse 304E may be 15 milliseconds.

In an embodiment, the first time interval T3 of each ON pulse may be different from the second time interval T4 of each OFF pulse. For example, the second time interval T4 of the first OFF pulse 304A may be 10 milliseconds. The first time interval T3 of the first ON pulse 304B may be 12 milliseconds. The second time interval T4 of the second OFF pulse 304C may be 8 milliseconds. The first time interval T3 of the second ON pulse 304D may be 14 milliseconds. The second time interval T4 of the third OFF pulse 304E may be 11 milliseconds. The first time interval T3 of the third ON pulse 304F may be 9 milliseconds.

In accordance with an embodiment, the circuitry 202 may be configured to set the first time interval T3 of the ON pulse and the second time interval T4 of the OFF pulse based on the frame rate of each video of the plurality of videos. For example, the frame rate may be 30 frames per second. Each ON pulse and each OFF pulse of the sequence of alternating ON/OFF pulses 304 may be a short duration pulse. In an example, in order to include one frame of a video of the plurality of videos in each ON pulse, the first time interval T3 may be set as 1/30th of a second. In such a case, the first time interval T3 of the first ON pulse 304B, the second ON pulse 304D and the third ON pulse 304F may be 1/30 of a second, which may be equal to a length of one frame of the video of the plurality of videos. Similarly, the second time interval T4 of the OFF pulse may be set based on the frame rate of each video of the plurality of videos. In another embodiment, in case of a rolling shutter, each ON pulse may overlap portions of two adjacent frames of the video of the plurality of videos. For example, each ON pulse may overlap a second half portion of a first frame and a first half portion of a second frame adjacent to the first frame.

In another example, the first time interval T3 may be set as 2/30th of a second such that each ON pulse may overlap two adjacent frames of the video of the plurality of videos. In such a case, the first time interval T3 of the first ON pulse 304B, the second ON pulse 304D, and the third ON pulse 304F may be 1/15th of a second, which may be equal to a length of two frames of the video of the plurality of videos. The circuitry 202 may generate the preamble of the synchronization signal 300 of any length or time duration and may generate the sequence of alternating ON/OFF pulses 304 of any length or time duration, with different time intervals for the ON and OFF pulses to reduce false positives in the detection of the synchronization signal 300. The circuitry 202 may control the drive of the one or more light-emitting devices 104 based on the synchronization signal 300 to generate the pattern of alternating light pulses. In another embodiment, the circuitry 202 may control the drive of the one or more audio devices based on the synchronization signal 300 to generate the pattern of alternating sound pulses.

FIG. 4 is a diagram that illustrates detection of a synchronization signal for synchronization of videos, in accordance with an embodiment of the disclosure. FIG. 4 is explained in conjunction with elements from FIGS. 1-3. With reference to FIG. 4, there is shown an exemplary scenario 400. In the exemplary scenario 400, there is shown a synchronization signal 402, a first video 404, a second video 406, and a user interface (UI) 408 for video production. The UI 408 may display an Nth frame 410 of the first video 404 and an Mth frame 412 of the second video 406 of the plurality of videos at a synchronized position. The synchronization signal 402 may be similar in configuration to the synchronization signal 300 shown in FIG. 3.

In the exemplary scenario 400, the plurality of imaging devices 106 may be disposed at different positions to record the scene from different viewpoints. In accordance with an embodiment, the one or more light-emitting devices 104 may be positioned in the field of view of each of the plurality of imaging devices 106. For example, the first light-emitting device 104A may be positioned in the field of view of the first imaging device 106A. The second light-emitting device 104B may be positioned in the field of view of the second imaging device 106B. The Nth light-emitting device 104N may be positioned in the field of view of the Nth imaging device 106N. In some embodiments, one light-emitting device of the one or more light-emitting devices 104 may be positioned in the field of view of all of the plurality of imaging devices 106.

In accordance with an embodiment, a distance between each light-emitting device of the one or more light-emitting devices 104 and a corresponding imaging device of the plurality of imaging devices 106 may be based on the intensity of the alternating light pulses, pose of each imaging device of the plurality of imaging devices 106, or the number of the one or more light-emitting devices 104 used. In an example, the distance may be less than or equal to 2 feet. In another example, each light-emitting device of the one or more light-emitting devices 104 may be positioned such that each light-emitting device may be one feet with respect to the lens of the corresponding imaging device of the plurality of imaging devices 106. A person of ordinary skill in the art will understand that the scope of the disclosure may not be limited to any specific distance requirement between the one or more light-emitting devices 104 and the plurality of imaging devices 106, as long as the image sensor of each of the plurality of imaging devices 106 receives the pattern of alternating light pulses concurrently.

In accordance with an embodiment, the one or more light-emitting devices 104 may include the LED or the LED strip. The circuitry 202 may control driving of the LED or the LED strip based on the generated synchronization signal 402 (including the preamble 302 and the sequence of alternating ON/OFF pulses 304 shown in FIG. 3) to generate the pattern of alternating light pulses including the preamble light pulse. In some embodiments, the DC control circuit 208 of the electronic device 102 may drive the one or more light-emitting devices 104 to generate the pattern of alternating light pulses. The plurality of imaging devices 106 may start capturing the plurality of videos at different time instants. In an embodiment, the plurality of imaging devices 106 may capture the generated pattern of alternating light pulses including the preamble light pulse prior to capture of the scene. The one or more light-emitting devices 104 may be removed from the field of view of the plurality of imaging devices 106 after the end of the pattern of alternating light pulses. The plurality of imaging devices 106 may then continue to capture the scene after the capture of the pattern of alternating light pulses. In an embodiment, the plurality of imaging devices 106 may capture still images at regular intervals, with the intervals of plurality of imaging devices 106 differing from one another. The intervals may be set to be consistent during the timeframe of the capture of the pattern of alternating light pulses (i.e. the synchronization pattern) and during the timeframe of the ensuing footage or captured still images.

In accordance with an embodiment, the circuitry 202 may be configured to switch ON the one or more light-emitting devices 104 based on the preamble (such as the preamble 302) to emit a preamble light pulse for the first time duration. The preamble light pulse may be a long duration pulse that may be emitted by the one or more light-emitting devices 104. It may be noted that the preamble light pulse refers to the first pulse emitted prior to the pattern of alternating light pulses (i.e. the synchronization pattern), and may include either a single long light pulse (as illustrated in FIGS. 3 and 4) or may include more than one pulse. The emitted preamble light pulse may be captured by each imaging device of the plurality of imaging devices 106. At the end of the first time duration, the circuitry 202 may alternatively switch ON and OFF the one or more light-emitting devices 104 based on the sequence of alternating ON/OFF pulses (such as the sequence of alternating ON/OFF pulses 304) to emit the pattern of alternating light pulses for the second time duration. The alternative switching ON and OFF of the one or more light-emitting devices 104 may generate the pattern of alternating light pulses. The pattern of alternating light pulses may be short duration pulses emitted by the one or more light-emitting devices 104 subsequent to the preamble. For example, the pattern of alternating light pulses may include three or more equally-spaced light pulses, or may include three or more light pulses with irregular spacing therebetween. The pattern of alternating light pulses may be captured by each imaging device of the plurality of imaging devices 106.

The circuitry 202 may be further configured to acquire the plurality of videos of the preamble light pulse followed by the pattern of alternating light pulses from the plurality of imaging devices 106. For example, the circuitry 202 may acquire the first video 404 from the first imaging device 106A and the second video 406 from the second imaging device 106B. The first video 404 and the second video 406 may include a sequence of frames. A first set of frames of each video the plurality of videos may include the preamble light pulse and a second set of frames of each video of the plurality of videos may include the pattern of alternating light pulses generated by the one or more light-emitting devices 104.

In an exemplary scenario, the first imaging device 106A may be switched ON before the second imaging device 106B. For example, the first imaging device 106A may be switched ON a few seconds before the second imaging device 106B is switched ON. A time difference between the switch ON of the first imaging device 106A and the second imaging device 106B may be due to a difference in performance of the first imaging device 106A and the second imaging device 106B, or due to a lag between user inputs. Due to the time difference between the switching ON of the first imaging device 106A and the second imaging device 106B of the plurality of imaging devices 106, the frames of the first video 404 in which the pattern of alternating light pulses may be recorded may be different from the frames of the second video 406 in which the pattern of alternating light pulses may be recorded. The circuitry 202 may acquire the first set of frames that may include the preamble and the second set of frames that may include the pattern of alternating light pulses recorded by each of the plurality of imaging devices 106.

The circuitry 202 may be configured to detect the preamble light pulse based on the first set of frames of each video of the plurality of videos. The circuitry 202 may detect the pattern of alternating light pulses based on the second set of frames of each video of the plurality of videos. The circuitry 202 may then determine a frame in each video, such as the first video 404 and the second video 406 of the plurality of videos, that includes a specific portion (such as a start light pulse or an end light pulse) of the pattern of alternating light pulses. The determined frame in each video of the plurality of videos corresponds to the same time instant (for example, same wall clock time). In accordance with an embodiment, the specific portion of the pattern of alternating light pulses may include one of a start light pulse of the pattern of alternating light pulses or the end light pulse of the pattern of alternating light pulses. For example, the start light pulse of the pattern of alternating light pulses may be the first OFF pulse 304A and the end light pulse may be the third ON pulse 304F of the pattern of alternating light pulses, as shown in FIG. 3.

In an example, the Nth frame 410 may be a frame number 147 of the second set of frames of the first video 404, and may include the end pulse of the pattern of alternating light pulses. In an example, the Mth frame 412 may be a frame number 226 of the second set of frames of the second video 406, and may include the end pulse of the pattern of alternating light pulses. The third ON pulse 304F of the synchronization signal 402 may correspond the Nth frame 410 of the first video 404, and the third ON pulse 304F of the synchronization signal 402 may correspond to the Mth frame 412 of the second video 406. The circuitry 202 may determine the Nth frame 410 of the first video 404 and the Mth frame 412 of the second video 406 that may correspond to the end light pulse of the pattern of alternating light pulses. The circuitry 202 may use the determined Nth frame 410 and the determined Mth frame 412 to obtain a synchronized position between the first video 404 and the second video 406. The difference between the Nth frame 410 and the Mth frame 412 may be referred to as the sync offset between the first video 404 and the second video 406.

In accordance with an embodiment, the circuitry 202 may detect the preamble light pulse of the first time duration in the first set of frames of the plurality of videos. In some embodiments, the circuitry 202 may detect the pattern of alternating light pulses of the second time duration in the first video 404 and the second video 406 subsequent to the detection of the preamble light pulse of the first time duration. In some embodiments, the circuitry 202 may verify the detection of the pattern of alternating light pulses based on the detection of the preamble light pulse, and vice versa. Details of the detection of the preamble light pulse and the detection of the pattern of alternating light pulses are further provided for example, in FIGS. 6A and 6B. Based on the synchronization of the first video 404 and the second video 406, the circuitry 202 may control the UI 408 to display a result of the synchronization. In an embodiment, the circuitry 202 may control the UI 408 to display the determined frames (such as the Nth frame 410 and the Mth frame 412) for user confirmation of the synchronization during video production. The UI 408 may be displayed on the I/O device 206 of the electronic device 102. In an example, the circuitry 202 may synchronize the plurality of videos such as the first video 404 and the second video 406 based on the user confirmation.

Figure 5:
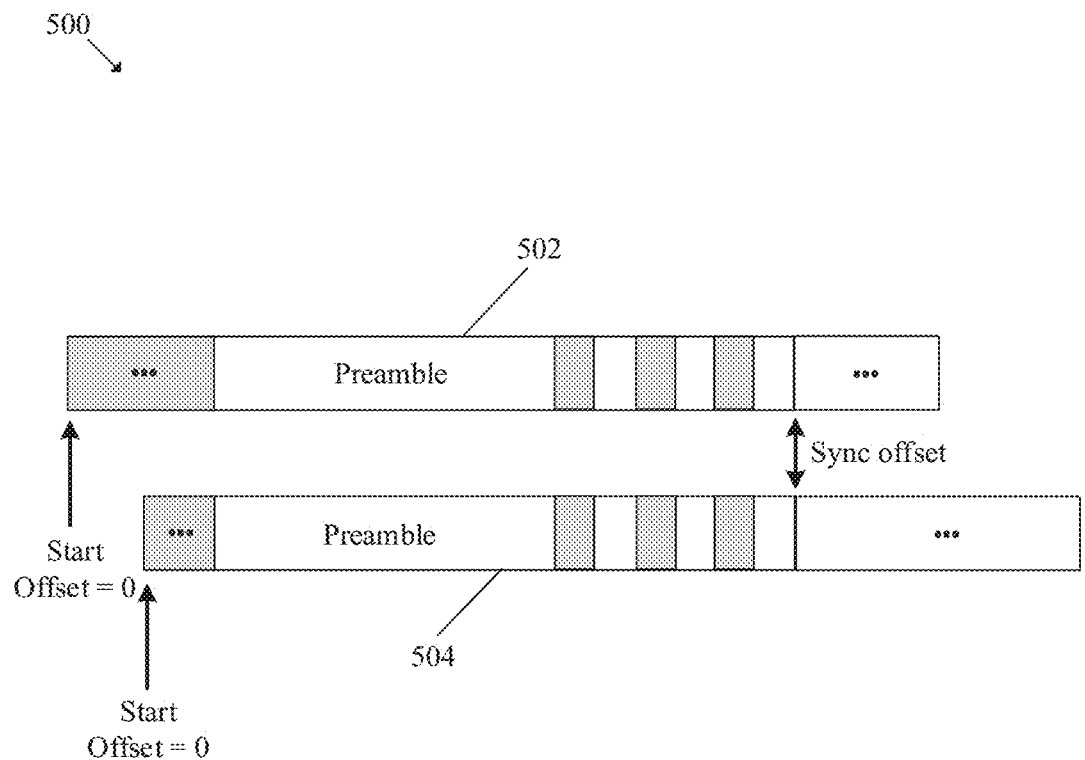
FIG. 5 is a diagram that illustrates detection of frames that correspond to a specific position of a synchronization signal for synchronization of videos, in accordance with an embodiment of the disclosure.

FIG. 5 is a diagram that illustrates detection of frames that correspond to a specific position of a synchronization signal for synchronization of videos, in accordance with an embodiment of the disclosure. FIG. 5 is explained in conjunction with elements from FIGS. 1-4. With reference to FIG. 5, there is shown an exemplary scenario 500. In the exemplary scenario 500, there is shown a first video 502 that includes the preamble light pulse and the pattern of pattern of alternating light pulses corresponding to the synchronization signal 402. In the exemplary scenario 500, there is shown a second video 504 that includes the preamble light pulse and the pattern of pattern of alternating light pulses corresponding to the synchronization signal 402. The first video 502 may be captured by the first imaging device 106A and the second video 504 may be captured by the second imaging device 106B.

The first video 502 and the second video 504 may start at different time instants. The initial few frames of the first video 502 and the second video 504 may be blank frames when the one or more light-emitting devices 104 may be turned OFF prior to emission of the preamble light pulse. In an example, the first video 502 and the second video 504 may be out of synchronization by a few frames. For the synchronization of the first video 502 and the second video 504, the circuitry 202 may detect an absolute frame number of the end light pulse of the pattern of alternating light pulses for each of the first video 502 and the second video 504. The difference between the absolute frame number of the first video 502 and the absolute frame number of the second video 504 may be referred to as the sync offset between the first video 502 and the second video 504. The circuitry 202 may use the detected absolute frame number of each video to synchronize the plurality of videos.

For example, the absolute frame number of the first video 502 corresponding to the end light pulse of the pattern of alternating light pulses may be frame #147. In another example, the absolute frame number of the second video 504 corresponding to the end light pulse of the pattern of alternating light pulses may be frame #226. The absolute frame number may be determined by the detection of the preamble light pulse and the pattern of alternating light pulses corresponding to the synchronization signal 402 included in the first video 502 and the second video 504. The circuitry 202 may synchronize the first video 502 and the second video 504 based on frame #147 of the first video 502 and frame #226 of the second video 504. Details of the detection of the preamble light pulse and the pattern of alternating light pulses are further described for example, in FIGS. 6A and 6B.

FIG. 6A is a flowchart that illustrates an exemplary method for detection of a preamble of a synchronization signal for synchronization of videos, in accordance with an embodiment of the disclosure. FIG. 6A is explained in conjunction with elements from FIGS. 1-5. With reference to FIG. 6A, there is shown a flowchart 600. The operations of the flowchart 600 may be executed by a computing system, such as the electronic device 102 or the circuitry 202. The operations may start at 602 and may proceed to 604. In an embodiment, the circuitry 202 may search for the preamble light pulse in the first video 502 based on an algorithm (such as a binary search algorithm). The first video 502 may be captured by the first imaging device 106A and the second video 504 may be captured by the second imaging device 106B.

At 604, a first frame of the first video 502 of the plurality of videos generated by the first imaging device 106A of the plurality of imaging devices 106 may be selected. In accordance with an embodiment, the circuitry 202 may be configured to select the first frame of the first video 502 of the plurality of videos generated by the first imaging device 106A of the plurality of imaging devices 106. The first frame may be one of an initial set of frames of the plurality of frames of the first video 502. For example, the first frame may be selected from the first L frames (L=300) of the plurality of frames of the first video 502. The first L frames of the plurality of frames may include a portion of the preamble light pulse.

At 606, a first amount of light intensity may be determined in the selected first frame of the first video 502. In accordance with an embodiment, the circuitry 202 may be configured to determine the first amount of light intensity in the selected first frame of the first video 502. The first amount of light intensity may be determined to search the frames in the first video 502 which may include the portion of the preamble light pulse.

At 608, a determination may be made whether the determined first amount of light intensity in the selected first frame is greater than a threshold intensity level. In accordance with an embodiment, the circuitry 202 may be configured to determine whether the determined first amount of light intensity in the selected first frame is greater than the threshold intensity level. The threshold intensity level may be preset based on the intensity level of the one or more light-emitting devices 104. The intensity level of the preamble light pulse and each ON pulse of the sequence of alternating ON/OFF pulses 304 may be above the threshold intensity level. The first amount of light intensity being greater than the threshold intensity level may be indicative of the presence of the preamble light pulse or the ON pulse of the sequence of alternating ON/OFF pulses 304 in the selected first frame of the first video 502.

At 610, a second frame of the first video 502 may be selected, based on the determination that the amount of light intensity in the selected first frame may be greater than the threshold intensity level. In accordance with an embodiment, the circuitry 202 may be configured to select the second frame of the first video 502 based on the determination that the amount of light intensity in the selected first frame may be greater than the threshold intensity level. The second frame of the first video 502 may be adjacent to the first frame of the first video 502.

The circuitry 202 may select the second frame that may be a subsequent frame or a prior frame of the first frame to detect the presence of the preamble light pulse. The preamble light pulse may be included in more than one frame of the plurality of frames of the first video 502, and the selection of the second frame adjacent to the first frame may be effective in detection of the preamble light pulse.

At 612, a third frame of the first video 502 of the plurality of videos may be selected, based on the determined first amount of light intensity in the selected first frame may be less than the threshold intensity level. In accordance with an embodiment, the circuitry 202 may be configured to select the third frame of the first video 502, based on the determination that the first amount of light intensity in the selected first frame may be less than the threshold intensity level. For example, the determined first amount of light intensity in the selected first frame being less than the threshold intensity level may be indicative of the absence of the preamble light pulse in the selected first frame. The selection of the third frame of the first video 502 may be based on the first time duration of the preamble light pulse. A time duration between the first frame of the first video 502 and the third frame of the first video 502 may be one of less than or equal to the first time duration of the preamble light pulse. For example, the third frame may be subsequent frame or a previous frame from the first frame. After the selection of the third frame as the first frame, control may pass to 606 to restart the search for the preamble light pulse in the first video 502.

For example, the first time duration of the preamble light pulse may be one second. The time duration between the first frame of the first video 502 and the third frame of the first video 502 may be 0.9 second to 1.1 seconds. In accordance with an embodiment, the circuitry 202 may be configured to search for the preamble light pulse from a start of the first video 502 by every N number of frames of the first video 502. The preamble light pulse may include the N number of frames.

In an exemplary scenario, the preamble light pulse may include the 30 number of frames (i.e. N≈30). For example, the frame number of the selected first frame may be 30. The frame number of the selected third frame may be either frame #1 or frame #59, based on the number of frames in the preamble light pulse. In some embodiments, the frame number of the selected third frame may be 58 or 60, which may be a few frames less than or greater the number of frames in the preamble light pulse to account for the difference in clock rates of the circuitry 202 and the first imaging device 106A. Based on the determination that the first amount of light intensity in the selected first frame may be less than the threshold intensity level, the third frame may be selected by skipping a few frames of the first video 502, such that the search for the preamble light pulse may be efficient. In an embodiment, the circuitry 202 may skip forward or backward one frame at a time to select the third frame, and restart the search for the preamble light pulse in the first video 502. The control may pass from 612 to 606, where the selected third frame may be treated as the selected first frame, and an amount of light intensity of the selected third frame may be determined and compared with the threshold intensity level.

At 614, a second amount of light intensity may be determined in the selected second frame of the first video 502. In accordance with an embodiment, the circuitry 202 may be configured to determine the second amount of light intensity in the selected second frame. The second amount of light intensity may be determined to detect the presence of the preamble light pulse in the first video 502.

At 616, a determination may be made whether the determined second amount of light intensity is greater than the threshold intensity level. In accordance with an embodiment, the circuitry 202 may be configured to determine whether the determined second amount of light intensity to be greater than the threshold intensity level. The determined second amount of light intensity being greater than the threshold intensity level may be in indicative of the presence of the preamble light pulse in the selected second frame of the first video 502. Control may pass to 612 based on the determination that the determined second amount of light intensity may be less than the threshold intensity level, to restart the search for the preamble light pulse by skipping one or more frames of the first video 502 forward or backward for the selection of the third frame as the first frame.

At 618, based on the determination that the determined second amount of light intensity may be greater than the threshold intensity level, a third amount of light intensity of a subsequent frame of the first video 502 may be compared with the threshold intensity level. The circuitry 202 may compare the third amount of light intensity of the subsequent frame of the first video 502 with the threshold intensity level. Based on the determination that the third amount of light intensity of the subsequent frame of the first video 502 may be greater than the threshold intensity level, the circuitry 202 may continue comparison of the third amount of light intensity of the subsequent frame with the threshold intensity level.

FIG. 6B is a flowchart that illustrates an exemplary method for detection of a preamble of a synchronization signal for synchronization of videos, in accordance with an embodiment of the disclosure. FIG. 6B is explained in conjunction with elements from FIGS. 1-5 and 6A.

At 620, based on the determination that the third amount of light intensity of the subsequent frame of the first video 502 may be less than the threshold intensity level, a determination may be made whether the number of frames between the first frame and the subsequent frame, having the third amount of light intensity less than the threshold intensity level, is approximately equal to the length of the preamble light pulse (N frames). The circuitry 202 may determine whether the number of frames between the first frame and the subsequent frame, having the third amount of light intensity less than the threshold intensity level, is approximately equal to the length of the preamble light pulse (N frames).

At 622, based on the determination that the number of frames of the first video 502 between the first frame and the subsequent frame is less than the length of the preamble light pulse by a threshold number of frames, a determination may be made whether the pattern of alternating light pulses (for example, three ON light pluses alternating with three OFF pulses) is detected after the subsequent frame, having the third amount of light intensity less than the threshold intensity level. The circuitry 202 may be further be configured to determine whether the pattern of alternating light pulses is detected after the subsequent frame, having the third amount of light intensity less than the threshold intensity level.

At 624, based on the determination that the number of frames between the first frame and the subsequent frame, having the third amount of light intensity less than the threshold intensity level, is approximately equal to the length of the preamble light pulse, the preamble light pulse of the first time duration may be detected in the first video 502. In accordance with an embodiment, the circuitry 202 may be configured to detect the preamble light pulse of the first time duration based on the determination that the number of frames between the first frame and the subsequent frame, having the third amount of light intensity less than the threshold intensity level, is approximately equal to the length of the preamble light pulse. For example, in case the number of frames between the first frame and the subsequent frame of the first video 502 is 27 frames and length of the preamble is 30 frames, the circuitry 202 may allow a certain degree of tolerance and may detect the preamble light pulse in the frames between the first frame and the subsequent frame of the first video 502.

At 624, based on the determination that the pattern of alternating light pulses is detected after the subsequent frame, having the third amount of light intensity less than the threshold intensity level, the preamble light pulse of the first time duration may be detected in the first video 502. In accordance with an embodiment, the circuitry 202 may be configured to detect the preamble light pulse of the first time duration based on the determination that the pattern of alternating light pulses is detected after the subsequent frame having the third amount of light intensity less than the threshold intensity level. Based on the detection of the pattern of alternating light pulses subsequent to the detection of the preamble light pulse, the circuitry 202 may verify the accuracy of the detection of the preamble light pulse, and the accuracy of the detection the synchronization signal 300. On the other hand, based on the determination that the pattern of alternating light pulses is not detected after the subsequent frame having the third amount of light intensity less than the threshold intensity level, control may pass to 612 to restart the search for the preamble light pulse in the first video 502.

In accordance with an embodiment, the circuitry 202 may be further configured to detect the preamble light pulse of the first time duration in the second video 504 of the plurality of videos generated by the second imaging device 106B of the plurality of imaging devices 106. The circuitry 202 may synchronize the first video 502 and the second video 504 of the plurality of videos, based on the detection of the preamble light pulse and the pattern of alternating light pulse in both the first video 502 and the second video 504. The detection of the frame corresponding to the end light pulse in both the first video 502 and the second video 504 and the sync offset may be utilized to synchronize the first video 502 and the second video 504.

In an embodiment, the circuitry 202 may synchronize the plurality of videos with an accuracy of the length of one frame (for example, 1/30 sec at 30 fps recording) of each video of the plurality of videos. In a case where information related to sensor scanning rate and rolling or global shutter mechanism is available, the circuitry 202 may achieve sub-frame accuracy based on a location of the detected alternating light pulses within a frame of each video of the plurality of videos. The circuitry 202 may further optimize the detection based on the pulse width (i.e. T3 and T4) of the alternating light pulses detected in the plurality of videos.

Figure 7:
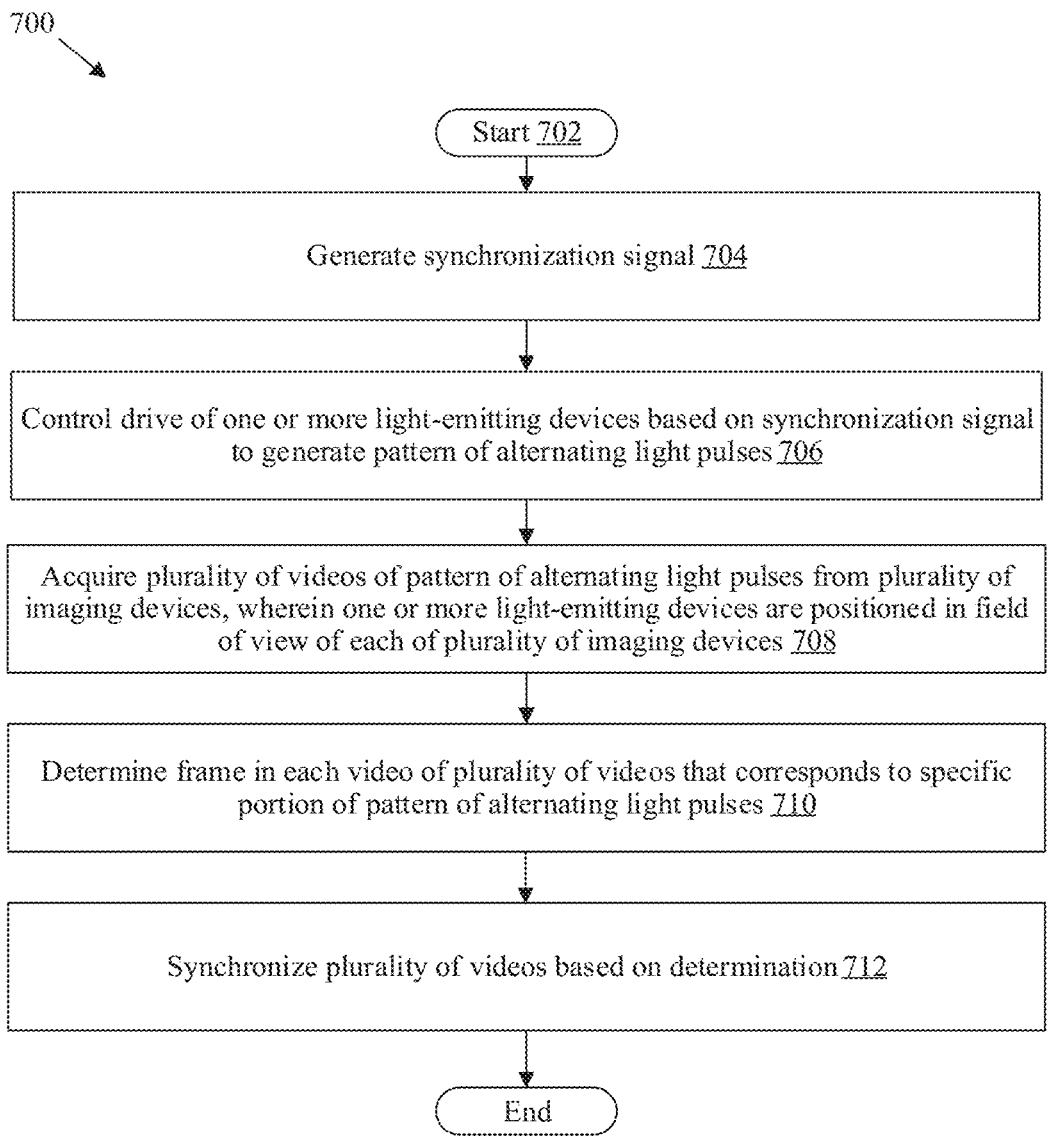
FIG. 7 is a flowchart that illustrates an exemplary method for synchronization of videos, in accordance with an embodiment of the disclosure.

FIG. 7 is a flowchart that illustrates an exemplary method for synchronization of videos, in accordance with an embodiment of the disclosure. FIG. 7 is described in conjunction with elements from FIGS. 1-5, 6A, and 6B. With reference to FIG. 7, there is shown a flowchart 700. The operations of the flowchart 700 may be executed by a computing system, such as the electronic device 102 or the circuitry 202. The operations may start at 702 and may proceed to 704.

At 704, the synchronization signal 300 may be generated. In accordance with an embodiment, the circuitry 202 may be configured to generate the synchronization signal 300. Details of the generation of the synchronization signal 300 are further described for example, in FIG. 3.

At 706, the drive of the one or more light-emitting devices 104 may be controlled based on the synchronization signal 300 to generate a pattern of alternating light pulses. In accordance with an embodiment, the circuitry 202 may be configured to control the drive of the one or more light-emitting devices 104, based on the synchronization signal 300 to generate a pattern of alternating light pulses. Details of the control of the drive of the one or more light-emitting devices 104 are further described for example, in FIG. 4.

At 708, the plurality of videos of the pattern of alternating light pulses may be acquired from the plurality of imaging devices 106, wherein the one or more light-emitting devices 104 may be positioned in the field of view of each of the plurality of imaging devices 106. In accordance with an embodiment, the circuitry 202 may be configured to acquire the plurality of videos, such as the first video 404 and the second video 406 of the pattern of alternating light pulses from the plurality of imaging devices 106. The one or more light-emitting devices 104 may be positioned in the field of view of each of the plurality of imaging devices 106. Details of the acquisition of the plurality of videos are further described for example, in FIG. 4.

At 710, the frame in each video of the plurality of videos that may correspond to the specific portion of the synchronization pattern (i.e. the pattern of alternating light pulses) may be determined. In accordance with an embodiment, the circuitry 202 may be configured to determine the frame in each video of the plurality of videos that includes the specific portion of the pattern of alternating light pulses. The determined frame in each video of the plurality of videos corresponds to the same time instant (for example, same wall clock time). Details of determination of the frame in each video are further described for example, in FIG. 4.

At 712, the plurality of videos may be synchronized based on the determination. In accordance with an embodiment, the circuitry 202 may be configured to synchronize the plurality of videos based on the determination of the frame in each video of the plurality of videos that may correspond to the specific portion of the pattern of alternating light pulses. Details of the synchronization of the plurality of videos are further described for example, in FIG. 5. The control may pass to end.

Although the flowchart 700 is illustrated as discrete operations, such as 704, 706, 708, 710 and 712, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium having stored thereon, computer-executable instructions that when executed by an electronic device (such as the electronic device 102) causes the electronic device 102 to execute operations. The operations may include generation of a synchronization signal (such as the synchronization signal 300). The operations may further include control of drive of one or more light-emitting devices (such as the one or more light-emitting devices 104) based on the synchronization signal 300 to generate a pattern of alternating light pulses. The operations may further include acquisition of a plurality of videos (such as the first video 404 and the second video 406) of the pattern of alternating light pulses from a plurality of imaging devices (such as the plurality of imaging devices 106). The one or more light-emitting devices 104 may be positioned in the field of view of each of the plurality of imaging devices 106. The operations may further include determination of the frame (such as the Nth frame 410 and the Mth frame 412) in each video of the plurality of videos that includes a specific portion of the pattern of alternating light pulses. The determined frame in each video of the plurality of videos corresponds to the same time instant (for example, same wall clock time). The operations may further include synchronization of the plurality of videos based on the determination.

Exemplary aspects of the disclosure may include an electronic device (such as the electronic device 102). The electronic device 102 may include circuitry (such as the circuitry 202) that may be configured to generate a synchronization signal (such as the synchronization signal 300). The circuitry 202 may be further configured to control drive of one or more light-emitting devices (such as the one or more light-emitting devices 104) based on the synchronization signal 300 to generate a pattern of alternating light pulses. The circuitry 202 may be further configured to acquire a plurality of videos (such as the first video 404 and the second video 406) of the pattern of alternating light pulses from a plurality of imaging devices (such as the plurality of imaging devices 106). The one or more light-emitting devices 104 may be positioned in the field of view of each of the plurality of imaging devices 106. The circuitry 202 may be further configured to determine the frame (such as the Nth frame 410 and the Mth frame 412) in each video of the plurality of videos that includes a specific portion of the pattern of alternating light pulses. The determined frame in each video of the plurality of videos corresponds to the same time instant (for example, same wall clock time). The circuitry 202 may be further configured to synchronize the plurality of videos based on the determination.

In accordance with an embodiment, the specific portion of the pattern of alternating light pulses may include one of a start light pulse of the pattern of alternating light pulses or an end light pulse of the pattern of alternating light pulses.

In accordance with an embodiment, the generated synchronization signal 300 may include a preamble (such as the preamble 302) of a first time duration and a sequence of alternating ON/OFF pulses (such as the sequence of alternating ON/OFF pulses 304) of a second time duration corresponding to the pattern of alternating light pulses. The one or more light-emitting devices 104 may be switched ON based on the preamble 302 to emit a preamble light pulse for the first time duration. The one or more light-emitting devices 104 may be alternatively switched ON and OFF for the second time duration based on the sequence of alternating ON/OFF pulses 304.

In accordance with an embodiment, the sequence of alternating ON/OFF pulses 304 may include an ON pulse of a first time interval that alternates with an OFF pulse of a second time interval. In an embodiment, the first time interval may be equal to the second time interval. In another embodiment, the first time interval may be different from the second time interval.

In accordance with an embodiment, the circuitry 202 may be configured to set the first time duration of the preamble 302 based on a frame rate of each video of the plurality of videos (such as the first video 404 and the second video 406). The first time duration of the preamble 302 may be longer than each of the first time interval of the ON pulse and the second time interval of the OFF pulse.

In accordance with an embodiment, the circuitry 202 may be further configured to set the first time interval of the ON pulse and the second time interval of the OFF pulse based on a frame rate of each video of the plurality of videos.

In accordance with an embodiment, the circuitry 202 may be further configured to detect the preamble light pulse of the first time duration. The circuitry 202 may further synchronize the plurality of videos based on the detection of the preamble light pulse.

In accordance with an embodiment, the circuitry 202 may be further configured to select a first frame of the first video 404 of the plurality of videos generated the first imaging device 106A of the plurality of imaging devices 106. The circuitry 202 may further determine a first amount of light intensity in the selected first frame of the first video 404. The circuitry 202 may select a second frame of the first video 404 generated by the first imaging device 106A. The selection of the second frame may be based on the determined first amount of light intensity in the selected first frame greater than a threshold intensity level. The second frame of the first video 404 may be adjacent to the first frame. The circuitry 202 may further determine a second amount of light intensity in the selected second frame is greater than the threshold intensity level. The circuitry 202 may compare a third amount of light intensity of a subsequent frame of the first video 404 with the threshold intensity level, wherein the comparison may be based on the determined second amount of light intensity in the second frame is greater than the threshold intensity level. The circuitry 202 may determine whether a number of frames between the first frame and the subsequent frame, having the third amount of light intensity less than the threshold intensity level, is equal to a length of the preamble light pulse. The circuitry 202 may detect the preamble light pulse of the first time duration based on the determination that the number of frames between the first frame and the subsequent frame is equal to the length of the preamble light pulse.

In accordance with an embodiment, the circuitry 202 may be further configured to detect the pattern of alternating light pulses of the second time duration in the first video 404 subsequent to the detection of the preamble light pulse of the first time duration.

In accordance with an embodiment, the circuitry 202 may be further configured to select a third frame of the first video 404 of the plurality of videos, based on the determined first amount of light intensity in the selected first frame is less than the threshold intensity level. The selection of the third frame of the first video 404 may be based on the first time duration of the preamble light pulse. The time duration between the first frame of the first video 404 and the third frame of the first video 404 may be one of less than or equal to the first time duration of the preamble light pulse.

In accordance with an embodiment, the circuitry 202 may be further configured to detect the preamble light pulse of the first time duration in the second video 406 of the plurality of videos generated by the second imaging device 106B of the plurality of imaging devices 106. The circuitry 202 may further synchronize the first video 404 and the second video 406 of the plurality of videos, based on the detection of the preamble light pulse in the first video 404 and the second video 406.

In accordance with an embodiment, the circuitry 202 may be further configured to search for the preamble light pulse from a start of the first video 404 of the plurality of videos by every N number of frames of the first video 404. The preamble light pulse may include the N number of frames.

In accordance with an embodiment, the distance between each light-emitting device of the one or more light-emitting devices 104 and a corresponding imaging device of the plurality of imaging devices 106 may be one of less than or equal to 2 feet.

In accordance with an embodiment, the one or more light-emitting devices 104 may include one of a light-emitting diode (LED) or an LED strip.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. An electronic device, comprising:
   circuitry configured to:
   generate a synchronization signal;
   control drive of one or more light-emitting devices based on the synchronization signal to generate a pattern of alternating light pulses;
   acquire a plurality of videos of the pattern of alternating light pulses from a plurality of imaging devices, wherein the one or more light-emitting devices are positioned in a field of view of each of the plurality of imaging devices;
   determine a frame in each video of the plurality of videos that includes a specific portion of the pattern of alternating light pulses, wherein the determined frame in each video of the plurality of videos corresponds to the same time instant; and
   synchronize the plurality of videos based on the determination.

2. The electronic device according to claim 1, wherein the specific portion of the pattern of alternating light pulses comprises one of a start light pulse of the pattern of alternating light pulses or an end light pulse of the pattern of alternating light pulses.

3. The electronic device according to claim 1, wherein
   the generated synchronization signal includes a preamble of a first time duration and a sequence of alternating ON/OFF pulses of a second time duration corresponding to the pattern of alternating light pulses,
   the one or more light-emitting devices are switched ON based on the preamble to emit a preamble light pulse for the first time duration, and
   the one or more light-emitting devices are alternatively switched ON and OFF for the second time duration based on the sequence of alternating ON/OFF pulses.

4. The electronic device according to claim 3, wherein
   the sequence of alternating ON/OFF pulses comprises an ON pulse of a first time interval that alternates with an OFF pulse of a second time interval, and
   the first time interval is equal to the second time interval.

5. The electronic device according to claim 3, wherein
   the sequence of alternating ON/OFF pulses comprises an ON pulse of a first time interval that alternates with an OFF pulse of a second time interval, and
   the first time interval is different from the second time interval.

6. The electronic device according to claim 5, wherein
   the circuitry configured to set the first time duration of the preamble based on a frame rate of each video of the plurality of videos, and
   the first time duration of the preamble is longer than each of the first time interval of the ON pulse and the second time interval of the OFF pulse.

7. The electronic device according to claim 5, wherein the circuitry is further configured to set the first time interval of the ON pulse and the second time interval of the OFF pulse based on a frame rate of each video of the plurality of videos.

8. The electronic device according to claim 3, wherein the circuitry is further configured to:
   detect the preamble light pulse of the first time duration; and
   synchronize the plurality of videos based on the detection of the preamble light pulse.

9. The electronic device according to claim 3, wherein the circuitry is configured to:
   select a first frame of a first video of the plurality of videos generated by a first imaging device of the plurality of imaging devices;
   determine a first amount of light intensity in the selected first frame of the first video;
   select a second frame of the first video generated by the first imaging device, wherein the selection of the second frame is based on the determined first amount of light intensity in the selected first frame is greater than a threshold intensity level, and the second frame of the first video is adjacent to the first frame;
   determine a second amount of light intensity in the selected second frame is greater than the threshold intensity level;
   compare a third amount of light intensity of a subsequent frame of the first video with the threshold intensity level, wherein the comparison is based on the determined second amount of light intensity in the second frame is greater than the threshold intensity level;

determine whether a number of frames between the first frame and the subsequent frame, having the third amount of light intensity less than the threshold intensity level, is equal to a length of the preamble light pulse; and detect the preamble light pulse of the first time duration based on the determination that the number of frames between the first frame and the subsequent frame is equal to the length of the preamble light pulse.

10. The electronic device according to claim 9, wherein the circuitry is further configured to:

based on the determination that the number of frames between the first frame and the subsequent frame is less than the length of the preamble light pulse, detect the pattern of alternating light pulses of the second time duration in the first video after the subsequent frame, having the third amount of light intensity less than the threshold intensity level; and detect the preamble light pulse of the first time duration based on the detection of the pattern of alternating light pulses.

11. The electronic device according to claim 9, wherein the circuitry is further configured to select a third frame of the first video of the plurality of videos, based on the determined first amount of light intensity in the selected first frame is less than the threshold intensity level, and the selection of the third frame of the first video is based on the first time duration of the preamble light pulse, and a time duration between the first frame of the first video and the third frame of the first video is one of less than or equal to the first time duration of the preamble light pulse.

12. The electronic device according to claim 9, wherein the circuitry is further configured to:

detect the preamble light pulse of the first time duration in a second video of the plurality of videos generated by a second imaging device of the plurality of imaging devices; and synchronize the first video and the second video of the plurality of videos, based on the detection of the preamble light pulse in the first video and the second video.

13. The electronic device according to claim 3, wherein the circuitry is further configured to search for the preamble light pulse from a start of a first video of the plurality of videos by every N number of frames of the first video, and the preamble light pulse comprises the N number of frames.

14. The electronic device according to claim 1, wherein a distance between each light-emitting device of the one or more light-emitting devices and a corresponding imaging device of the plurality of imaging devices is one of less than or equal to 2 feet.

15. The electronic device according to claim 1, wherein the one or more light-emitting devices comprise one of a light-emitting diode (LED) or an LED strip.

16. A method, comprising:
generating a synchronization signal;
controlling drive of one or more light-emitting devices based on the synchronization signal to generate a pattern of alternating light pulses;
acquiring a plurality of videos of the pattern of alternating light pulses from a plurality of imaging devices, wherein the one or more light-emitting devices are positioned in a field of view of each of the plurality of imaging devices;
determining a frame in each video of the plurality of videos that includes a specific portion of the pattern of alternating light pulses, wherein the determined frame in each video of the plurality of videos corresponds to the same time instant; and
synchronizing the plurality of videos based on the determination.

17. The method according to claim 16, wherein the specific portion of the pattern of alternating light pulses comprises one of a start light pulse of the pattern of alternating light pulses or an end light pulse of the pattern of alternating light pulses.

18. The method according to claim 16, wherein
the generated synchronization signal includes a preamble of a first time duration and a sequence of alternating ON/OFF pulses of a second time duration corresponding to the pattern of alternating light pulses,
the one or more light-emitting devices are switched ON based on the preamble to emit a preamble light pulse for the first time duration, and
the one or more light-emitting devices are alternatively switched ON and OFF for the second time duration based on the sequence of alternating ON/OFF pulses.

19. The method according to claim 18, further comprising setting the first time duration of the preamble based on a frame rate of each video of the plurality of videos, wherein
the sequence of alternating ON/OFF pulses comprises an ON pulse of a first time interval that alternates with an OFF pulse of a second time interval, and
the first time duration of the preamble is longer than each of the first time interval of the ON pulse and the second time interval of the OFF pulse.

20. A non-transitory computer-readable medium having stored thereon, computer-executable instructions which, when executed by an electronic device, cause the electronic device to execute operations, the operations comprising:
generating a synchronization signal;
controlling drive of one or more light-emitting devices based on the synchronization signal to generate a pattern of alternating light pulses;
acquiring a plurality of videos of the pattern of alternating light pulses from a plurality of imaging devices, wherein the one or more light-emitting devices are positioned in a field of view of each of the plurality of imaging devices;
determining a frame in each video of the plurality of videos that includes a specific portion of the pattern of alternating light pulses, wherein the determined frame in each video of the plurality of videos corresponds to the same time instant; and
synchronizing the plurality of videos based on the determination.

* * * * *